United States Patent
Haggie (10) Patent No.: US 8,819,041 B2
(45) Date of Patent: Aug. 26, 2014

(54) ANALYZING DATA WITHIN A DATA REPORT (75) Inventor: Thomas Haggie, Vancouver (CA)

(73) Assignee: Business Objects Software Limited, Dublin (IE)

( * ) Notice: Subject to any disclaimer, the term of this patent is extended or adjusted under 35 U.S.C. 154(b) by 1096 days.

(21) Appl. No.: 12/644,029

(22) Filed: Dec. 22, 2009

(65) Prior Publication Data

US 2011/0153643 A1    Jun. 23, 2011

(51) Int. Cl.
*G06F 17/30* (2006.01)
*G06Q 10/06* (2012.01)

(52) U.S. Cl.
CPC ..................................... *G06Q 10/06* (2013.01)
USPC ......................................................... 707/758

(58) Field of Classification Search
USPC .......................................................... 707/763
See application file for complete search history.

(56) References Cited

U.S. PATENT DOCUMENTS

| 5,555,403 A | 9/1996 | Cambot et al. |
| 2005/0262087 A1 | 11/2005 | Wu et al. |
| 2005/0289136 A1 | 12/2005 | Wu et al. |
| 2005/0289137 A1 | 12/2005 | Wu et al. |

OTHER PUBLICATIONS

Hoffmann & Lowe, SmartDraw for Dummies, Jun. 2, 2009, For Dummies, 1st edition.*

* cited by examiner

*Primary Examiner* — Ajay Bhatia
*Assistant Examiner* — Kurt Mueller (57) ABSTRACT

Described are methods and systems related to analyzing data within a data report. The data report, including a result set and metadata associated with the result set is retrieved. The result set is analyzed to identify one or more fields. Dimensions and measures within the result set are inferred. Based upon the inferred dimensions and measures, a user interface element is rendered on a user interface. The user interface element is utilized to define a query. Based upon the query defined in the user interface element, a measure included in the query is aggregated along a dimension included in the query, to create a collection of aggregations. A visual representation of the collection of the aggregations is rendered on the user interface.

17 Claims, 9 Drawing Sheets

| | 204a | 204b | 204c | 204d | 204e | 204f |
|---|---|---|---|---|---|---|
| | YEAR | MONTH | STORE NAME | STATE | SALES REVENUE | QUANTITY SOLD |
| | 2008 | 1 | E-FASHION AUSTIN | TEXAS | 82337.45 | 614.50 |
| | 2008 | 1 | E-FASHION BOSTON NEWBURY | MASSACHUSETTS | 38798 | 236 |
| | 2008 | 1 | E-FASHION CHICAGO 33RD | ILLINOIS | 101985 | 670 |
| | 2008 | 1 | E-FASHION COLORADO SPRINGS | COLORADO | 41687 | 309 |
| | 2008 | 1 | E-FASHION DALLAS | TEXAS | 50352.32 | 352 |
| | 2008 | 1 | E-FASHION HOUSTON | TEXAS | 72785 | 504 |
| | 2008 | 1 | E-FASHION HOUSTON LEIGHTON | TEXAS | 85086 | 624.50 |
| | 2008 | 1 | E-FASHION LOS ANGELES | CALIFORNIA | 101056 | 676 |
| | 2008 | 1 | E-FASHION MIAMI SUNDANCE | FLORIDA | 55732.67 | 378 |
| | 2008 | 1 | E-FASHION NEW YORK 5TH | NEW YORK | 77879 | 534 |
| | 2008 | 1 | E-FASHION NEW YORK MAGNOLI | NEW YORK | 144595 | 949 |
| | 2008 | 1 | E-FASHION SAN FRANCISCO | CALIFORNIA | 77131.93 | 504.50 |
| | 2008 | 1 | E-FASHION WASHINGTON TOLBA | DC | 74120 | 542 |
| | 2008 | 2 | E-FASHION AUSTIN | TEXAS | 48126 | 365 |
| | 2008 | 2 | E-FASHION BOSTON NEWBURY | MASSACHUSETTS | 27823 | 196 |
| | 2008 | 2 | E-FASHION CHICAGO 33RD | ILLINOIS | 63674.62 | 463 |
| | 2008 | 2 | E-FASHION COLORADO SPRINGS | COLORADO | 35181 | 261 |
| | 2008 | 2 | E-FASHION DALLAS | TEXAS | 45922 | 335.50 |
| | 2008 | 2 | E-FASHION HOUSTON | TEXAS | 37308 | 278 |

ANALYZING DATA WITHIN A DATA REPORT

TECHNICAL FIELD

Embodiments of the invention generally relate to computer systems, and more particularly to methods and systems for analyzing data within a report.

BACKGROUND

Reports contain data retrieved from a data source and formatted according to a report schema. Structure of the data that is formatted may be different from the structure it possessed in the data source. For instance, a sales report containing the sales information about a product XYZ for the last twelve months may include sales revenue generated for the product, month of sales, customer details and the like that are typically present in the sales report in an unstructured manner. Reporting tools provide techniques to present the data present in a data report in a more structured manner. These tools also allow users to explore data contained in the data report, and make business decisions related to the data report. However, users looking for specific sections in the data report according to specific criteria have to go through the entire data report manually, and make necessary comparisons or other business decisions. That is, the reports contain a limited set of projections and aggregations of the data. For instance, to find total sales revenue generated for the month of January 2008 in a report with a product dimension hierarchy, the user has to go through the data report manually to find out the instances of revenue generated in the month of January 2008. Further, the users have to determine the sales revenue for the month of January 2008, and manually take a business decision, like finding out the total sales revenue. Also, currently available tools do not allow users to modify the criteria based upon which they are analyzing the data report.

Hence, there is a need for providing a method and system to analyze the data present in the data report, and to analytically represent such data to ease the users' interaction with the data in the data report.

SUMMARY

Embodiments of the invention are generally directed to methods and systems for analyzing data within a data report. The data report, including a result set and metadata associated with the result set is retrieved. The data report may be retrieved from a data report repository. The result set is analyzed to identify one or more fields. Dimensions and measures within the result set are inferred. Based upon the inferred dimensions and measures, a user interface element is rendered on a user interface. The user interface element is utilized to define a query. Based upon the query defined in the user interface element, a measure included in the query is aggregated along a dimension included in the query, to create a collection of aggregations. A visual representation of the collection of the aggregations is rendered on the user interface.

In an embodiment, the above method may be used to systemize the data within the data report. The required data transformations are codified and the required data is presented as a set of possible actions with respect to what the user would like to see in the visual representation.

These and other benefits and features of embodiments of the invention will be apparent upon consideration of the following detailed description of preferred embodiments thereof, presented in connection with the following drawings in which like reference numerals are used to identify like elements throughout.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of the invention are generally directed to methods and systems for analyzing data within a data report. The data report may be residing on a local system, in a database or in a memory of the system. Data reports may have a large amount of data, including a result set and associated metadata of the result set. A result set, contained in the data report, typically represents a particular instance of the data report. The data report may have many such result sets and associated metadata. In an embodiment, the metadata associated with the result set is human readable descriptive text. The result set generally includes one or more fields and one or more values existing for each instance of the result set, described as records.

To analyze one such instance of the result set, parts of the result set are identified, and presented to a user. The user is given an option of querying the result set, and analyzing a concerned instance of the result set. Based upon the query received from the user, the instances of the result set are identified and presented in an analytical manner, for example a visual representation.

In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1A:
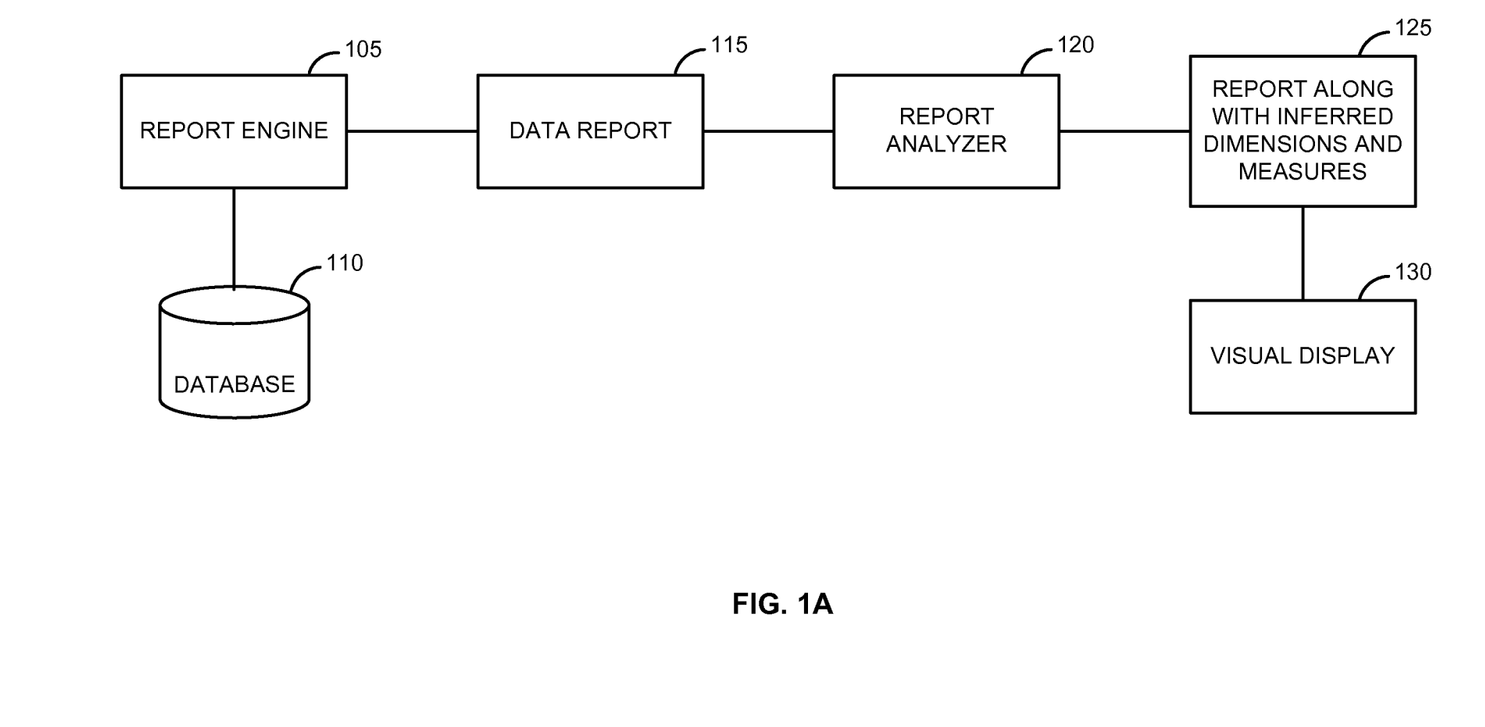
FIG. 1A provides a conceptual illustration for analyzing data within a data report, according to an embodiment of the invention.

FIG. 1A provides a conceptual illustration for analyzing data within a data report, according to an embodiment of the invention. Report engine 105, retrieves data from database 110 and formats it according to a report schema to create data report 115. A data report may be described as a document that holds a collection of findings and information about a business scenario. The collection of information may be determined based upon a property of an element in the business scenario. For instance, for a business scenario "sales" of an element "product ABC", a sales data report of the product ABC may include a collection of findings of revenue generated over five years, and information about the revenue, market rate of the product, validity period of the product, and the like. Thus, data reports may have a large amount of data. Data report 115 may be residing on a local system, in a database or in a memory of the system, for instance, in database 110. Data report 115, including a result set and metadata associated with the result set is retrieved from database 110. A result set, contained in data report 115, may represent a particular instance of the data report 115. The result set may represent a collection of information resulting from a specific task performed for the element of the data report 115, or for a specific instance. For example, a result set of a sales data report for a product ABC, may contain information about the "sales of the product ABC for year 2008", including a list of "stores that sell the product ABC", "address of the stores", "number of units of the product ABC sold", "revenue generated at a particular store", "contact information of distributors", and the like. The data report 115 may have many such result sets and associated metadata, for each instance of the data report 115. In an embodiment, the metadata associated with the result set is human readable descriptive text. The metadata of the result set of a sales data report of the product ABC may include properties of the product ABC like the manufacturer's information, the geographical area of sales, the month of manufacture, the quantity of product manufactured for each month, and the like that are specific to the product ABC.

The result set of data report 115 includes one or more fields and one or more values existing for each instance of the result set, described as records. A field may be described as a distinct set of the result set, and the records may be described as the values for the corresponding field, at a given instance. For example, a field "customer name" may have a record "John", a field "order date" may have a record "4 Oct. 2008", a field "order amount" may have a record "$ 6450", and the like. In an embodiment, the field names and the records of each of the field names may collectively be known as fields. These fields and their corresponding records present in the data report are identified. For instance, a result set may include a field name "store location", to describe the field. The field with the field name "store location" may contain a record of the locations of a store, including the address of each store for each location.

In an embodiment, report engine 105 may be utilized to identify the fields and the corresponding records of a data report 115. In another embodiment, report engine 105 creates data report 115 by retrieving a report template and a corresponding result set from database 110. The report template may be described as a template of a report for a particular business scenario. The fields and the corresponding records are further examined to infer one or more dimensions and corresponding measures.

A dimension represents a group of one or more enumerable entities like products, people, financial elements, and units of time. For example, a sales report may be viewed in dimensions of a product, a store, geography, a date, and the like. An alternative definition is a plurality of unique entities in a distinct category or set. A measure or a metric is a quantity as ascertained by comparison with a standard, usually denoted in some metric, for example, units sold and dollars. A measure, such as sales revenue, can be displayed for dimension customer, product and geography. For example, in a sales report, "quantity count" can be displayed for dimension "quantity". Other measures may include sum of sales revenue, count of a store, and the like. A measure may be a resultant of an aggregation of identical measures for a dimension. In other words, one can aggregate measures along a dimension. For instance, measure "revenue" may be displayed for dimension "year". Here, the measure describes an aggregation of all the revenues for all the years. A measure can also be displayed for each of the values or records within a dimension. A value or a record may be described as a quantity (for example, numeric quantity) that has been defined for a particular instance of the data report.

In an embodiment, the dimensions and the measures are inferred by report analyzer 120. Report analyzer 120 identifies the fields and records that are present in data report 115. The inference is based on the data and metadata in the report. In an embodiment, the inference is based upon a field type of each field and data in the records (alternatively the values included in each field). The data report along with inferred dimensions and measures 125, for each of the fields may be presented to a user on visual display 130. Based upon the fields of data report 115, a user interface (UI) element may be generated and rendered on a user interface, for instance, on visual display 130. In an embodiment, each UI element may represent an inferred dimension or measure from data report 115. The UI element may be utilized to define a query. In an embodiment, the user may define a query by selecting one or more UI elements. The user makes a selection of at least one dimension and at least one measure. An aggregation engine aggregates the measures by the dimensions. In an embodiment, a visual representation of the collection of the aggregations is rendered on the user interface.

Figure 1B:
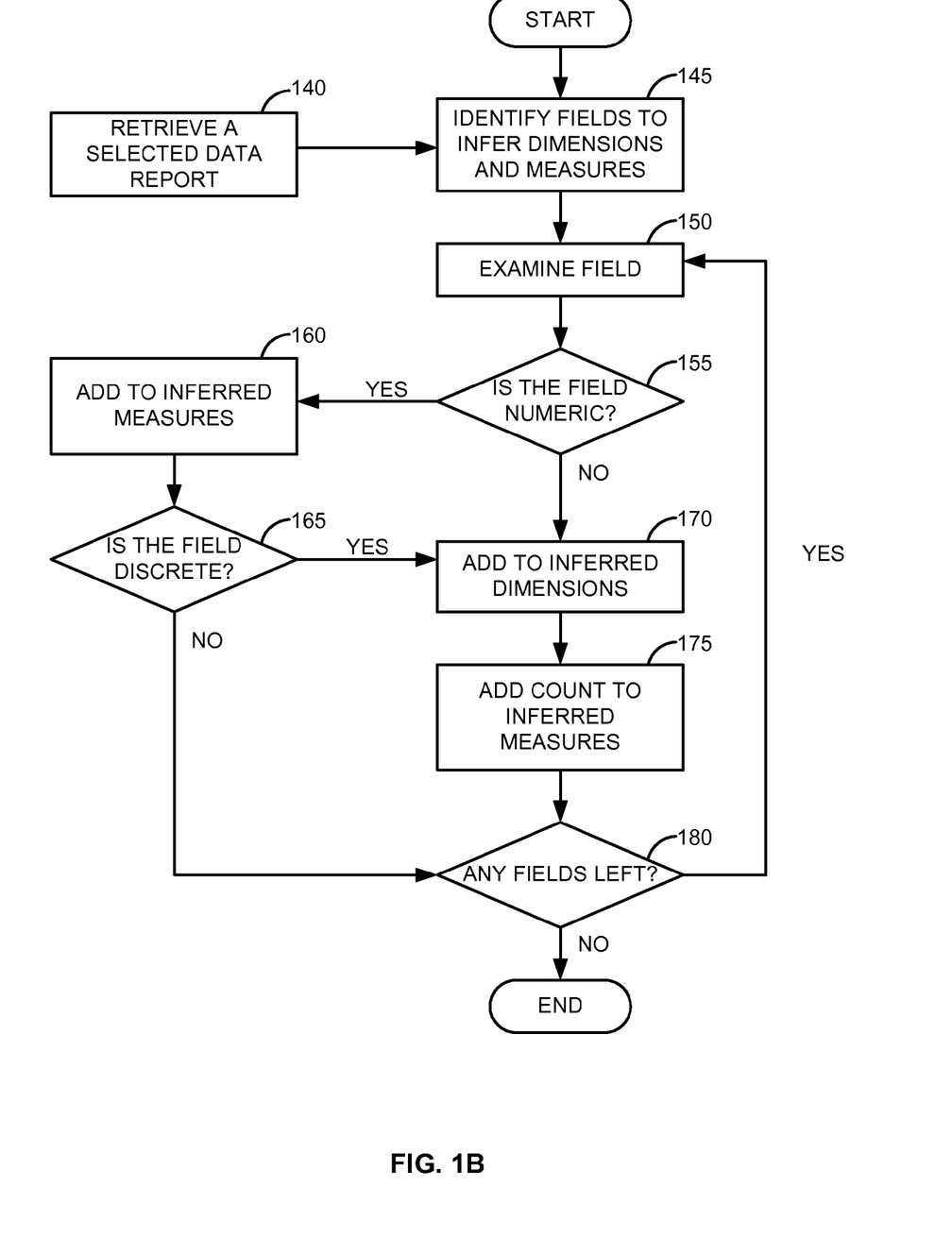
FIG. 1B illustrates an exemplary process for analyzing data within a data report, according to an embodiment of the invention.

FIG. 1B illustrates an exemplary process for analyzing data within a data report, according to an embodiment of the invention. A selected data report, including a result set and metadata associated with the result set is retrieved 140. The data report may have many such result sets and associated metadata, for each instance of the data report. The result set of the data report includes one or more fields and one or more values existing for each instance of the result set, described as records. The data report is analyzed to identify one or more fields 145 present in the data report to infer zero or more dimensions and one or more measures. In an embodiment, one or more records that exist for each field may also be identified. Based upon the identified fields and the corresponding identified records of the fields, zero or more dimensions and one or more measures are inferred. Each field is examined 150, to determine a field type for each field. The values contained in the field may be of numeric type and/or non-numeric type, and the field thus is a numeric field or a non-numeric field. The type of the field is determined at decision block 155.

Based upon the field type and the record type of the records that the field includes, zero or more dimensions and one or more measures associated with the field are inferred. If the field examined is a numeric field 155 (YES), the field is added to the inferred measures. At 165, the process determines whether the numeric field is discrete. If the numeric field examined is discrete 165 (YES), a dimension is inferred for the discrete numeric field. In an embodiment, if zero or more dimensions exist in the process, the dimension inferred for the discrete numeric field is added to the existing dimensions, at 170. Each such discrete numeric field is included as an independent dimension. Next, the process proceeds to 180. If the numeric field is not discrete 165 (NO), the process proceeds to 180, to check if any other fields exist in the selected data report retrieved at 140.

Returning to decision block 155, if the field examined is a non-numeric field 155 (NO), the process proceeds to 170, where a dimension for the field is inferred and added to the existing dimensions. For each dimension inferred at 170, a count of the measure is added to the inferred measures at 175. A count measure is the number of instances of a unique value. For example, of the set {a, a, b, c} the value "a" has a count of 2 and the rest have a count of 1. The inferred measures and dimensions constitute metadata to a multi-dimensional data set that may be constructed from the data report. The process proceeds to 180, to check if any other field exists in the data report. In an embodiment, the process of FIG. 1B can be augmented to ignore fields where all of the values are unique, e.g., where the cardinality of the field equals the number of records. Such a field would not be analyzed to determine if it was a dimension or a measure.

Based upon the inferred measures and/or dimensions present in the data report, a user interface (UI) element may be generated and rendered on a UI, for instance on a visual display. In an embodiment, the UI element may represent one or more measures and dimensions inferred from the data report. The UI element may be utilized to define a query. In an embodiment, the user may define a query by selecting one or more UI elements. Based upon the query, an aggregation of the data in the data report is made to form a collection of aggregations. A collection of aggregations includes a multi-dimensional result set. A visual representation of the collection of the aggregations is rendered on the user interface.

Figure 2A:
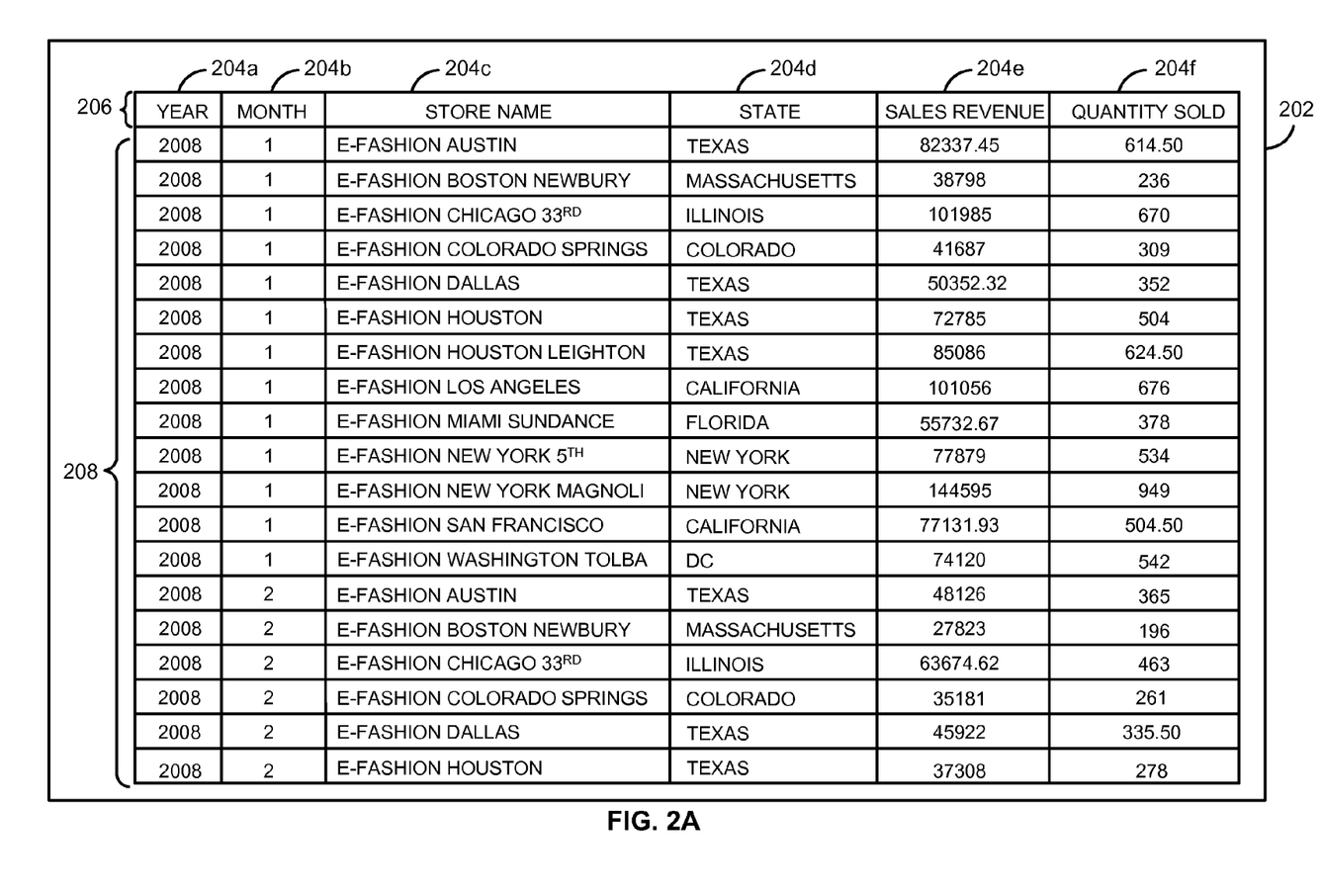
FIG. 2A illustrates an exemplary result set, according to an embodiment of the invention.

FIG. 2A illustrates an exemplary result set, according to an embodiment of the invention. The data report including result set 202 and associated metadata may be retrieved from a data report repository. Result set 202 may be described as an input to a process of analyzing data within a data report. Result set 202 of the data report includes one or more fields and one or more values existing for each instance of the result set, described as records. In an embodiment, result set 202 includes one or more fields, described in one or more columns including year 204*a*, month 204*b*, store name 204*c*, state 204*d*, sales revenue 204*e*, and quantity sold 204*f*. Field names of the fields are defined in header 206 and corresponding rows 208 of each field includes the records. For instance, field 204*d*, with field name STATE includes a listing of the states, for example, TEXAS, MASSACHUSETTS, ILLINOIS, COLORADO, and the like, that describes the record of field 204*d*. One or more fields and the corresponding records that exist in result set 202 of the data report are identified.

The fields and the corresponding records are examined to infer dimensions and measures. A field type is identified for each of the fields, and based upon the type of the field a dimension may be inferred. In an embodiment, based upon record type for the records included in each field, the corresponding measures are inferred. For instance, dimensions inferred from result set 202 may include year, month, store name and state, and measures inferred may include count of year, sum of year, count of month, sum of month, count of store name, count of state, sum of sales revenue and sum of quality sold. The sum function may be replaced by other aggregation functions, such as, minimum value, maximum value, average value, last value, and the like.

A user interface element rendered on the UI is operable to accept a user selection of a query. A query is typically a criteria based upon which the user is analyzing the data report. Thus, the query may have an association with the data present in the data report. In other words, the query may be associated to one or more dimensions and one or more measures. The query specifies a collection of aggregations to be created by the aggregation engine from the data in the data report. The query may further include filters specifying particular values or ranges of values of a dimension to be included in the aggregations. Filtering is done as a part of analysis of the data.

This aggregation of measures of each dimension may determine the count of elements having a similar value for that dimension, or a sum of all the values for that dimension, and the like. Common aggregation functions include minimum value, maximum value, averages (e.g., mean), last value, and distinct count of value. These can be referred to as minimum of values, maximum of values, etc. Alternatively, these can be referred to as "minimum of", "maximum of", etc. or simply minimum, maximum, etc. The aggregation of measures may determine many such attributes that give a general view about elements contained in the corresponding dimensions. An analytical representation of the collection of aggregation of measures for the dimensions associated with the query is rendered on the user interface. The analytical representation may be a visual representation of the collection of aggregation of measures. Thus, the data report including a large amount of data is analyzed and viewed based upon the criteria specified by the user.

Figure 2B:
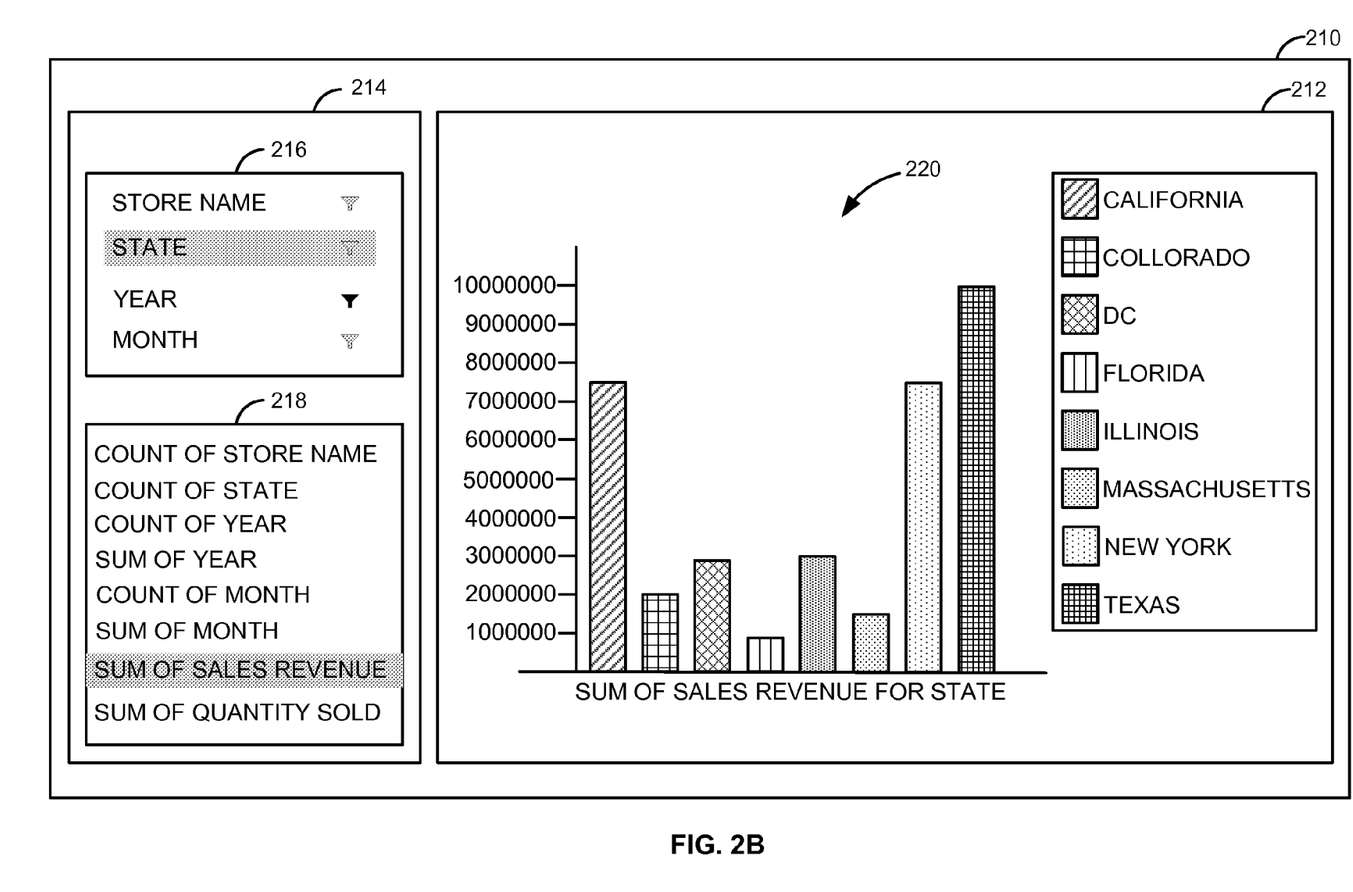
FIGS. 2B and 2C illustrate exemplary screen displays of a visual representation of data of a report along two different dimensions, according to an embodiment of the invention.
Figure 2C:
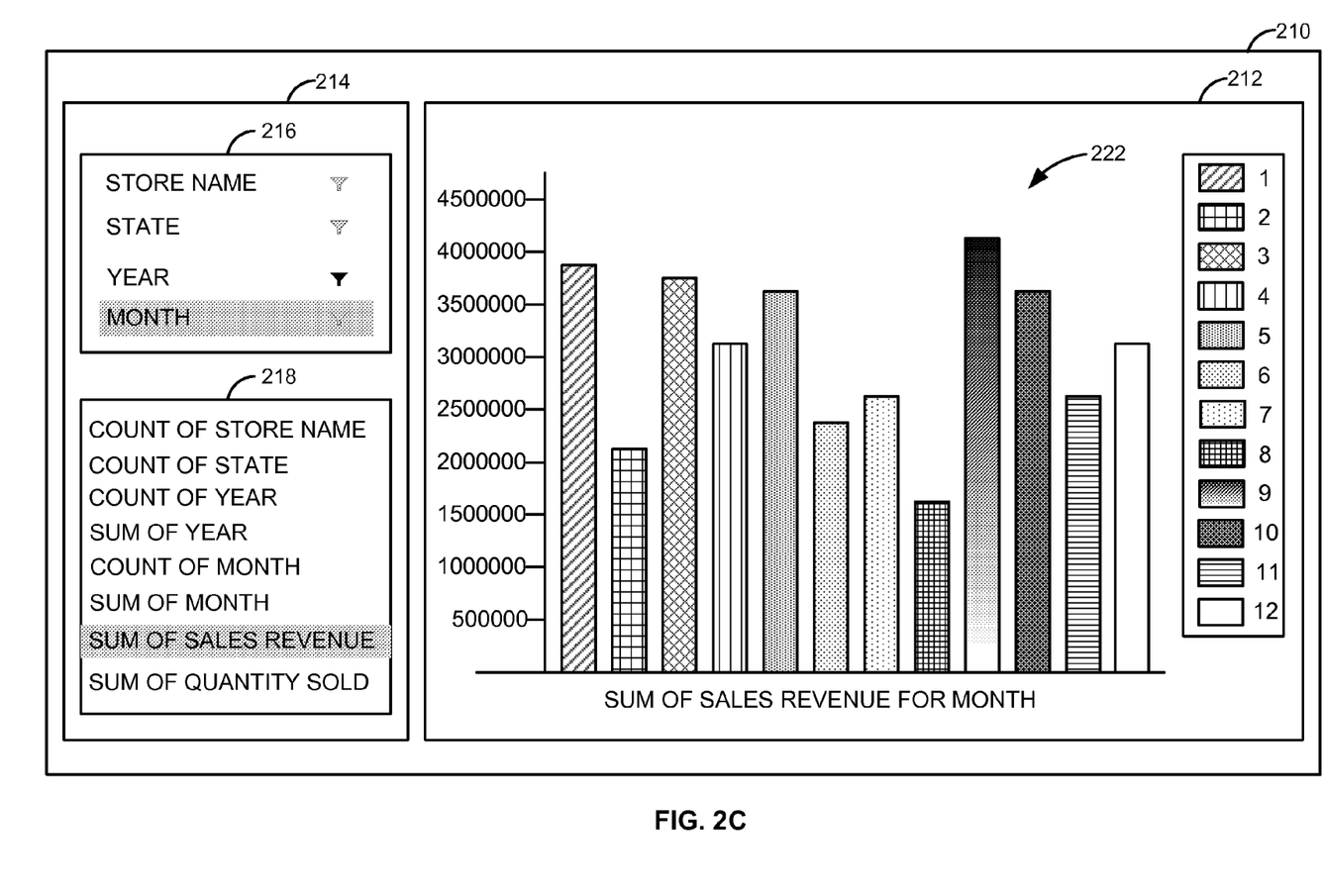

FIGS. 2B and 2C illustrate exemplary screen displays of a visual representation of data of a report along two different dimensions, according to an embodiment of the invention. FIGS. 2B and 2C display a visual representation of data extracted from a same result set 202. The data report including a result set 202 and metadata associated with the result set 202 is retrieved. The result set 202 is analyzed to identify one or more fields. Based upon the identified fields, dimensions and measures are inferred. Based upon the inferred measures and dimensions UI element 214 is generated on user interface 210. User interface element 214 includes interactive zones 216 and 218. Interactive zones 216 and 218 may be utilized to define a query. For instance, for FIG. 2B, in interactive zone 216, a dimension "state" is selected and in interactive zone 218, a measure "sum of sales revenue" is selected. This selection of one or more UI elements is one of many manners in which the query is defined. Based upon the query defined, for instance, the selection of two UI elements in interactive zones 216 and 218, the selected measures are aggregated along the selected dimensions to create a collection of aggregations. In an embodiment, a collection can include one value. That is a measure aggregated over all dimensions. In an embodiment, a collection can include two values. That is one measure aggregated over a dimension with two values (e.g., gender). Alternatively, the two values can be for two measures over all dimensions. In an embodiment the collection is two dimensional. In an embodiment the collection is three dimensional or of a higher dimension.

A visual representation of the collection of the aggregations is rendered in display panel 212 of user interface 210, as illustrated in FIG. 2B. The visual representation can be a table (e.g., cross tabulation), chart, map or the like. The visual representation in this example is chart 220 showing "sales revenue" by "state". Chart 220 illustrates a view of the data present in result set 202 of the data report selected, where the view of the data is decided by the user. Similarly, FIG. 2C includes chart 222 that illustrates a view of the data present in result set 202 of the report selected, where the selected UI elements in interactive zones 216 and 218 correspond to the dimension "month" and the measure "sum of sales revenue" respectively. In an embodiment, the visual representation of the collection of aggregation of measures may be dependent on the user selection of the query. For instance, if the user has selected two UI elements in 216, representing the field "QUANTITY SOLD" and the field "SALES REVENUE", analytical representation is rendered in 220, such that the aggregation of quantity sold is represented on one axis and the sales revenue is represented on another axis of a chart.

Figure 3:
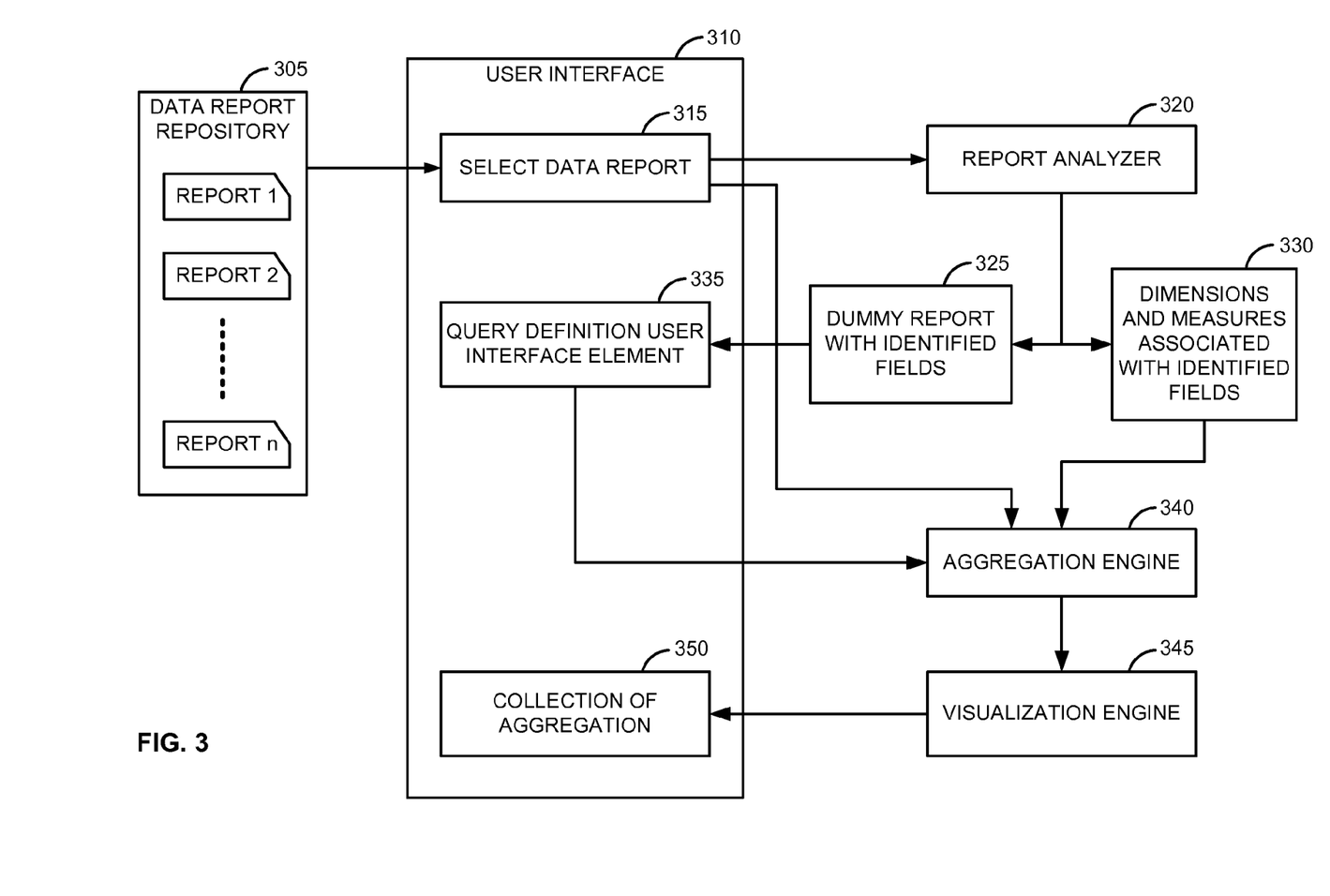
FIG. 3 illustrates a block diagram of a process for analyzing data within a data report, according to an embodiment of the invention.

FIG. 3 illustrates a block diagram of a process for analyzing data within a data report, according to an embodiment of the invention. Data report repository 305 may include a collection of data reports. One such data report is selected 315. In an embodiment, the selection is made through user interface 310. In an embodiment, a user is provided with an option of selecting a data report 315 utilizing user interface 310. For the selected data report, report analyzer 320 is invoked, to analyze the result set of the selected data report. Report analyzer 320 identifies one or more fields that are present in the selected data report. In an embodiment, report analyzer 320 creates a dummy report with the identified fields 325. Based upon the identified fields of the selected data report, report analyzer 320 infers zero or more dimensions and corresponding one or more measures 330, which are associated with the identified fields of the selected data report. In an embodiment, report analyzer 320 infers the dimensions and measures depending upon a field type of the field. The field type is determined based upon a record type of the records included in the field. For instance, for field "year of sales" that contains records "2007, 2003, 2004", the field type is said to be numeric. For field "contact person" that contains records "Mike, Lisa, Charles", the field type is said to be non-numeric.

In an embodiment, numeric and non-numeric fields are aggregated and processed differently. For a numeric field, report analyzer 320 considers that the data present in the numeric field may be aggregated (e.g., summed, counted) or used as a name of a value in a dimension. For instance, if the field "SALES REVENUE" has a record "833, 633, 724, 633, 833, 633", report analyzer 320 infers that this field is a measure. The field may be aggregated as the particular aggregation "sum of the records". That is, for this example, 833+633+724+633+833+633 equals 4289. Another aggregation is number of times each record has occurred or the "count of the records". That is, in this example, for 833, count is 2; for 633, count is 3; for 724, count is 1. In an embodiment, the count is only applied to discrete numeric fields. For non-numeric field, report analyzer 320 considers that the data present in the non-numeric field may be counted or used as a name to a value in a dimension. For instance, if the field "STATE" has associated records "TEXAS, ILLINOIS, ALASKA, ILLINOIS, TEXAS, ILLINOIS", report analyzer 320 infers the measure based on the aggregation "count of the records". That is, for this example: for TEXAS, count=2; for ILLINOIS, count=3; for ALASKA, count=1.

In an embodiment, a value is used as name of a value. In another embodiment, the name is replaced with a localized name or a non-technical name. In an embodiment, the name of the field is the name of the dimension. In another embodiment, the name of the dimension is the name of the field in the report as altered by the user or systematically. For example, at design time or view time, localizing a name of a field or substituting a name for a non-technical or familiar name. In another embodiment, the name of the dimension is the name of the column in the database that the field corresponds to. Such a name could be replaced or localized at report design time or view time.

Below table "Table 1" shows sample dimensions and measures for the fields identified from a result set.

TABLE 1

| Field | Type of Data | Dimension | Measure |
|---|---|---|---|
| Sales Revenue | Numeric; Non-Discrete | N/A | Sum of sales revenue |
| Store name | Non-numeric (Text) | Store name | Count of store name |
| State | Non-numeric (Text) | State | Count of state |
| Month | Numeric; Discrete | Month | Sum of month; Count of month |

For instance, if the field is "Sales Revenue", the type of data is numeric and non-discrete, hence the field is not an inferred dimension and the appropriate measure is a sum and not a count. Sales revenue is an example of a measured inferred by processing a field via the path through blocks 155, 160, 165, and 180 in FIG. 1B. In another example, from Table 1, if the field is "Month", the type of data is numeric and discrete. Month is an example of the processing of a field via the path through blocks 155, 160, 165, and 170 in FIG. 1B. Hence the inferred dimension is month. The inferred measures are the count of the month and the sum of the month. However, a normal user of the analysis software will realize that sum of a field like month is not used in analysis. They would not select such a measure even if presented in a UI because of their experience or the context of the analysis. Similarly, if the field is "state", the type of data is non-numeric, hence the inferred dimension is the state (i.e., the set of names of the states) and the inferred measure is the count of each state. State is an example of the processing of a field via the path from block 155 to block 170 in FIG. 1B.

Returning to FIG. 3, based upon the identified fields, query definition user interface element 335 is rendered on user interface 310. Query definition user interface element 335 is utilized by the user to define a query. The query is typically a criteria based upon which the user is analyzing the data report. Thus, the query defines a transformation of data present in the data report. The query may be defined in various ways, including entering a data in query definition user interface element 335, selecting a field that is included in the query definition user interface element 335, and the like. The query defined may be associated to one or more fields identified by report analyzer 320. In an embodiment, query definition user interface element 335 may include a group of fields that are identified by report analyzer 320. The user may select one or more of the fields in the query definition user interface element 335, based upon which the data report is analyzed.

Based upon the user input to the query, aggregation engine 340 aggregates the measures along the dimensions included in the query.

In an embodiment, aggregation engine 340 generates an accumulator each time it encounters a new value for each dimension. The accumulator keeps a count of the measures that have a similar value. The accumulator may also account for the sum of such values of measures. This accumulator is used to get the count and/or sum of the measures of the values of the dimension. For instance, for a dimension 'Month' includes the values: January, February, March and April. Each value can be rendered as a natural number corresponding to the order of the months in the Gregorian calendar. Each appears more than once, as shown in the below table "Table 2". The corresponding aggregations are shown for the measure sum of revenue in "Table 3" below.

TABLE 2

| Record No. | Month | Revenue |
|---|---|---|
| 1 | 02 | $234 |
| 2 | 03 | $345 |
| 3 | 01 | $456 |
| 4 | 04 | $567 |
| 5 | 03 | $678 |
| 6 | 01 | $798 |
| 7 | 02 | $8910 |

TABLE 3

| Month | Sum of Revenue | Count of Month |
|---|---|---|
| 01 | $456 + 798 | 2 |
| 02 | $234 + 8910 | 2 |
| 03 | $345 + 678 | 2 |
| 04 | $567 | 1 |

Aggregation engine 340 initiates a first accumulator at record no. 1, for the month "02". This accumulator counts the number of appearances of month "02", which is two (at record nos. 1 and 7) and sums the revenue that has been generated for the month "02", which is $9144 (sum of $234 and $8910). Similarly, aggregation engine 340 initiates a second accumulator at record no. 2, a third accumulator at record no. 3 and a fourth accumulator at record no. 4. In an embodiment, a single accumulator may be programmed to get count and/or sum of values of the dimensions as distinct set of aggregations. Aggregation engine 340 creates a collection of aggregation 350 of the measures of the dimensions corresponding to the query. For instance, considering "Table 3", a collection of aggregation 350 for month "02" is created, having a count of two and a sum of $9144.

Visualization engine 345 renders a visual representation of the collection of aggregation 350 on user interface 310. The visual representation of the collection of aggregation 350 is one of various analytical representations. One skilled in the art would appreciate the ability of representing analytical data in various manners. In an embodiment, visualization engine 345 renders a table, with corresponding fields that are identified by report analyzer 320, and this table is displayed on user interface 310. In an embodiment, visualization engine 345 renders a chart displayed on user interface 310. A chart may be described as a visual display of data, where the data is represented as lines, bars, bubbles, pie slices, contours, or the like. In an embodiment, visualization engine 345 renders a crosstab. In an embodiment, visualization engine 345 renders a map plotting the data in the collection aggregations against a geographic dimension, e.g., state. The visualization of the chart reflects the query defined by the user. For instance, if the user has defined a query that contained dimension "sales revenue" for a particular "month", the chart may depict the values of the "sales revenue" for the defined "month".

In an embodiment, the user may be provided with an option of choosing a manner in which the chart is to be displayed on user interface 310. For instance, the user may specify fields that are intended to be used as dimensions or measures. The user may be provided with options to choose the type of chart that the user wishes to view. Depending upon the chart type, the user may also specify one or more fields to retrieve a more detailed analysis of the data in the data report. The user's specification of the manner in which the user wishes to view the data in the data report describes a view of the data present in the data report. The result set may then be projected into the view of the data, by aggregating the measures along the corresponding dimensions that are associated with the query.

Aggregation engine 340 iterates over the entire result set, and builds a set of the aggregated values for the measures and associated dimensions selected by the user. Once aggregated, the data may be rendered as a chart. For example, if the user specifies to view "customer name" in the horizontal axis of the chart and "sum of revenue" in the vertical axis of the chart, the revenue is broken down by customer. In an embodiment, the chart shows a sub set of the values of the dimension, for example, displaying which customers generate the highest revenue. Once the chart is generated, the user is also given an option of manipulating the data displayed in the chart by changing the selection of dimensions to be viewed, or by swapping the dimensions, and the like. In an embodiment, if a single dimension is selected, a default view of the chart may be rendered on user interface 310. This default view may give the user an estimate of how the chart would look for the selected dimension.

In another embodiment, aggregation engine 340 is operable to identify any modifications to the query. Based upon any such modifications, aggregation engine 340 executes corresponding modifications with respect to aggregating the measures of dimensions that are associated with the query. Based upon the modifications, visualization engine 345 renders a visual representation of the modified collection of aggregation 350 on user interface 310.

Figure 4:
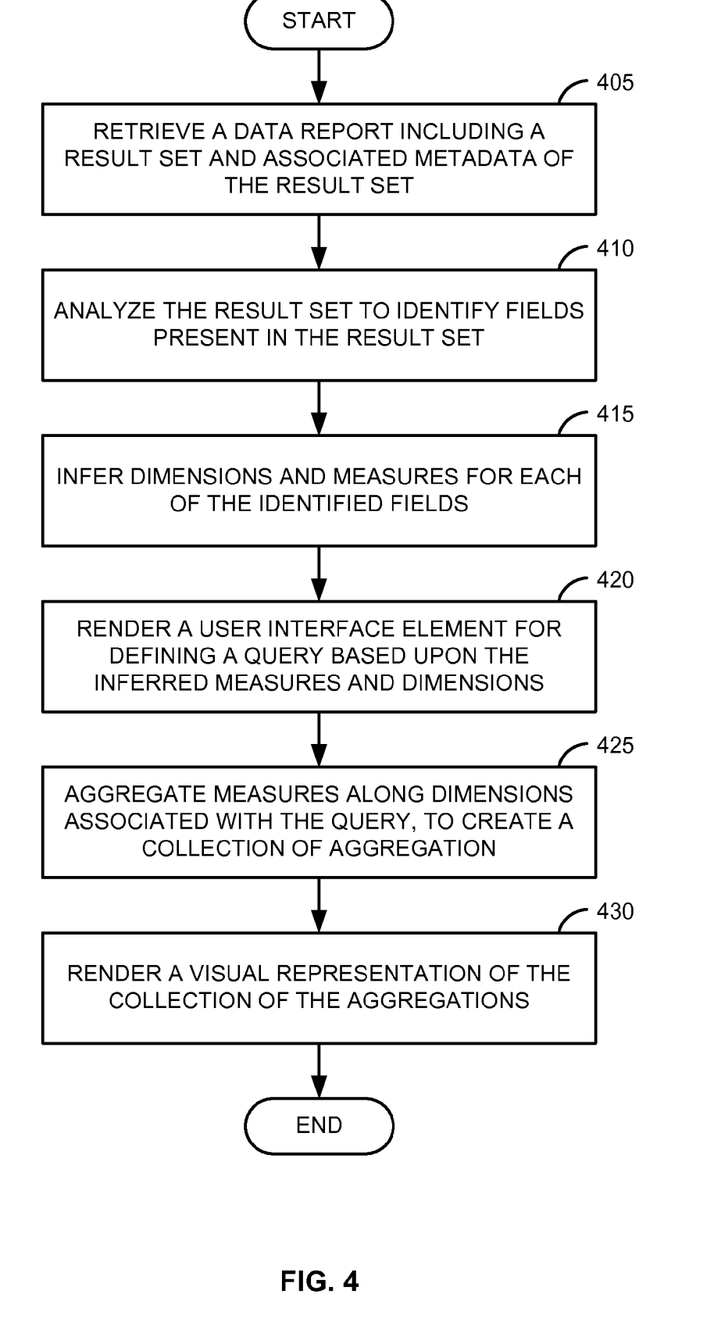
FIG. 4 illustrates an exemplary process for analyzing data within a data report according to an embodiment of the invention.

FIG. 4 illustrates an exemplary process for analyzing data within a data report according to an embodiment of the invention. In process block 405, the data report including a result set and metadata associated with the result set is retrieved. The data report may be residing in a data report repository. In process block 410, the result set is analyzed to identify one or more fields present in the result set. In process block 415, based upon the identified fields, dimensions and measures are inferred for each field. Based upon the inferred dimensions and measures, a user interface element is rendered in process block 420. The user interface element is operable to accept a query based upon the identified fields. In an embodiment, a user may select one or more fields to analyze the data present in the fields, for instance, records of the fields. The measures included in the query are aggregated along each dimension associated with the query, in process block 425, to create a collection of aggregations. In process block 430, the collection of the aggregations is rendered as a visual representation. In an embodiment, the user may review the collection of aggregations and elect to define a new collection of aggregations. In that case, processing loops back to before block 425. An updated collection of aggregations will be created by a re-aggregation according to the updated query. The ability to select different dimensions and measures to analyze data is a manner in which multi-dimensional data analysis is amenable to ad hoc query creation and data exploration.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable medium as instructions. The term "computer readable medium" should be taken to include a single medium or multiple media that stores one or more sets of instructions. The term "computer readable medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer-readable media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with computer readable software instructions.

Figure 5:
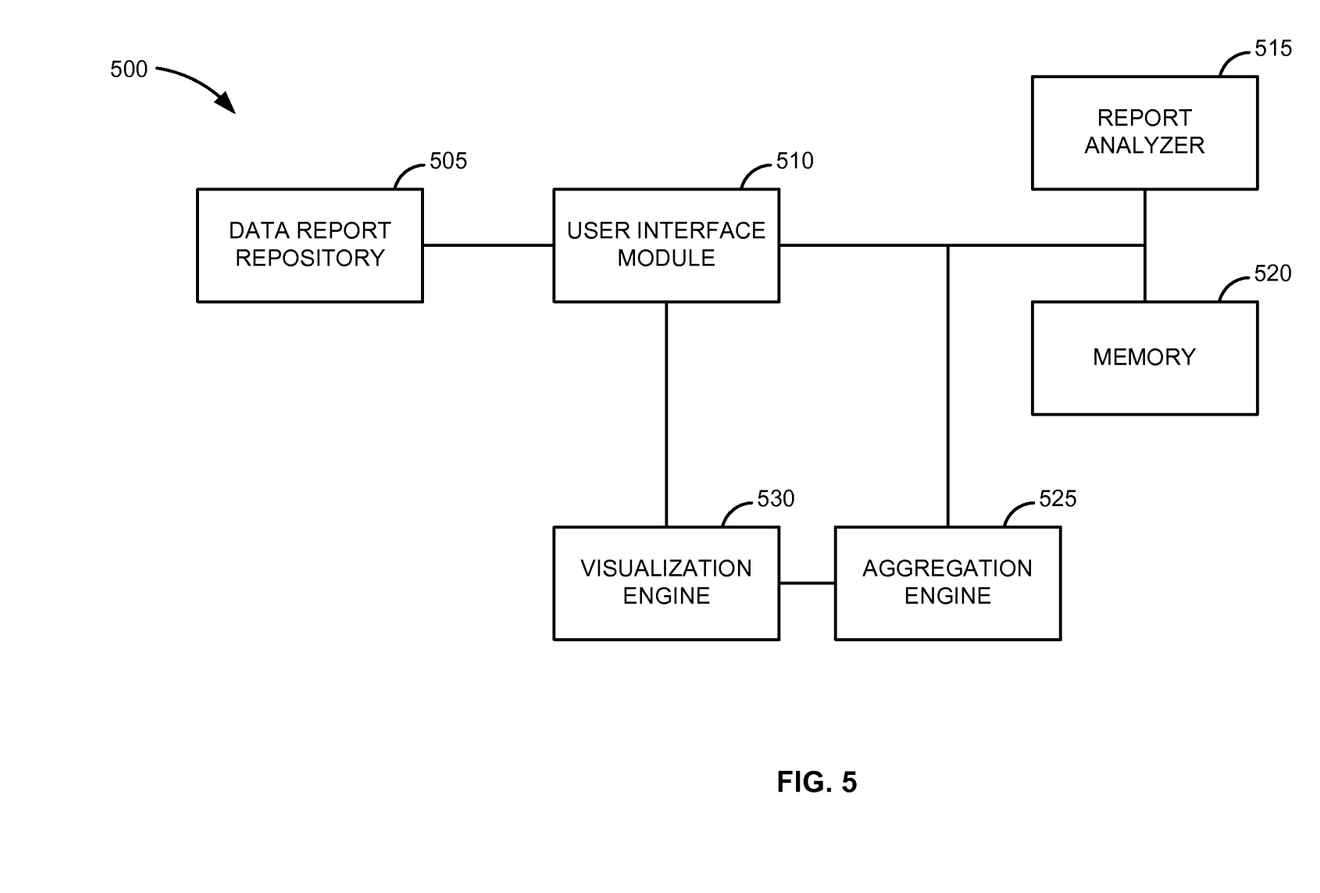
FIG. 5 illustrates a block diagram of a system for analyzing data within a data report, according to an embodiment of the invention.

FIG. 5 illustrates a block diagram of a system for analyzing data within a data report, according to an embodiment of the invention. Computer system 500 is utilized for analyzing the data within the data report. Some embodiments of the invention may include the above-described methods as being written as one or more software components. These components, and the functionality associated with them, represented as computer system 500 may include data report repository 505, user interface module 510, report analyzer 515, memory 520, aggregation engine 525 and visualization engine 530. In an embodiment, data report repository 505 is in communication with user interface module 510. User interface module 510 is in communication with report analyzer 515, memory 520, aggregation engine 525 and visualization engine 530. Report analyzer 515 is in communication with memory 520. Aggregation engine 525 is in communication with user interface module 510 and visualization engine 530.

Computer system 500 includes data report repository 505 to store one or more data reports. A user interface in communication with user interface module 510 may be responsible for user interactions involved during the process of analyzing data in the data report. User interface module 510 may receive a user selection of one or more data reports from the UI. Based upon the user selection of the data reports, report analyzer 515 analyzes the data report to identify one or more fields present in the data report. Report analyzer 515 infers one or more associated dimensions and corresponding measures for each identified field present in the data report. The dimensions and measures may be stored in memory 520. The inferred dimensions and corresponding measures are stored in memory 520. Based upon the fields identified by report analyzer 515, user interface module 510 renders a user interface element on the user interface. The user interface element is utilized to define a query. In an embodiment, each UI element may represent an identified field in the data report. A user may define the query, by selecting one or more UI elements that represent the identified fields. The query thus defined may be associated with one or more dimensions inferred for the fields represented by the UI element. Based upon the query, aggregation engine 525 aggregates corresponding measures of the dimensions associated with the fields selected in the query. Aggregation engine 525 creates a collection of aggregation of the measures of the dimensions corresponding to the query. In an embodiment, aggregation engine 525 includes an accumulator for accumulating one or more measures that have a similar value, for each dimension that is associated with the query. Visualization engine 530 renders a visual representation of the collection of the aggregation on the user interface, through user interface module 510. In an embodiment, aggregation engine 525 identifies a modification that may be performed on the visual representation of the collection of aggregation. Based upon the modification identified, visualization engine 530 performs the necessary modifications to the visual representation.

Figure 6:
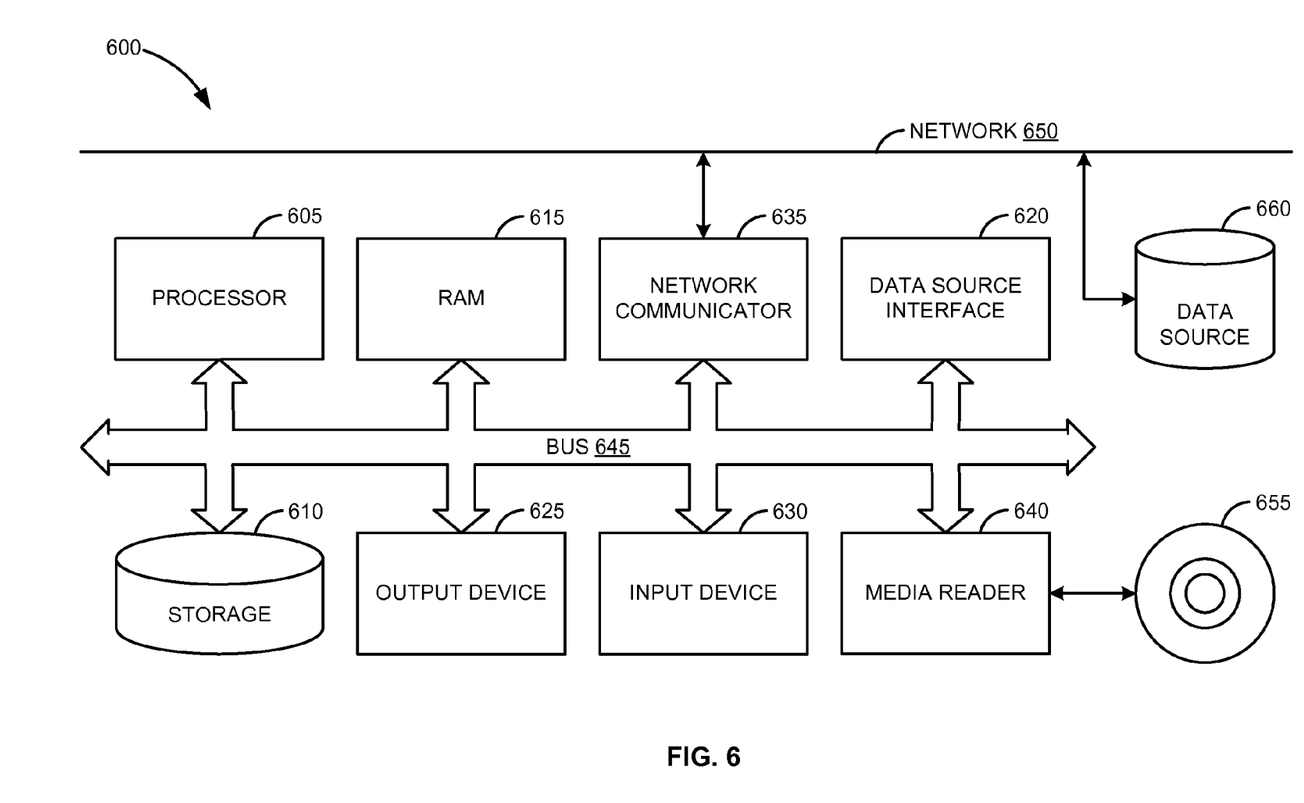
FIG. 6 illustrates a block diagram of a system for analyzing data within a data report, according to an embodiment of the invention.

FIG. 6 illustrates a block diagram of an exemplary computer system for analyzing data within a data report, according to an embodiment of the invention. The computer system 600 includes a processor 605 that executes software instructions or code stored on a computer readable medium 655 to perform the above-illustrated methods of the invention. The computer system 600 includes a media reader 640 to read the instructions from the computer readable medium 655 and store the instructions in storage 610 or in random access memory (RAM) 615. The storage 610 provides a large space for keeping static data where at least some instructions could be stored for later execution. The stored instructions may be further compiled to generate other representations of the instructions and dynamically stored in the RAM 615. The processor 605 reads instructions from the RAM 615 and performs actions as instructed. According to one embodiment of the invention, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660 at a server computer system. The data source 660 can be accessed via one or more abstraction layers implemented in hardware or software. For example, the data source 660 may be accessed by network 650. In some embodiments the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

The data report may be residing in storage 610 or RAM 615 of system 600. In an embodiment, the data report is retrieved from a repository in data source 660 and transferred to storage 610 or RAM 615. A result set, contained in the data report, represents a particular instance of the data report. The data report may have many such result sets and associated metadata. In an embodiment, the metadata associated with the result set is human readable descriptive text and is stored in storage 610. In an embodiment, the metadata is in binary format suitable for report engine or a report reader application. The result set generally includes one or more fields and one or more values existing for each field. The collected values are described as records. To analyze one such instance of the result set, parts of the result set are identified, and presented to a user. For instance, one or more fields that are included in the data report are identified. Zero or more dimensions and one or more measures are inferred. The inferred dimensions and measures are presented to the user through output device 625. The user is given an option of querying the result set, and analyzing a concerned instance of the result set. A query is constructed from the selected dimensions and measures. Based upon the query received from the user through input device 630, the instance of the result set is identified and a collection of aggregations created by processor 605. The collection of aggregations is presented through output device 625, in an analytical manner, for example a visual representation.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. An article of manufacture, comprising a non-transitory computer-readable medium comprising computer readable instructions which when executed by a computer, cause the computer to perform a method for analyzing data within a data report, the method comprising:

retrieving a data report including a result set and associated metadata of the result set;

analyzing the result set to identify one or more fields present in the result set;

based upon the one or more fields and corresponding one or more field types, inferring a set of dimensions and measures within the result set;

based upon the inferred set of dimensions and measures, rendering one or more user interface elements for defining a query, wherein each of the one or more user interface elements is associated with a member of the set of dimensions and measures inferred from the result set;

receiving a user selection of one or more of the rendered user interface elements for inclusion in the query;

aggregating the measures along the corresponding dimensions associated with the selected user interface elements included in the query, to generate a collection of aggregations; and rendering a visual representation of the collection of the aggregations.

2. The article of manufacture of claim 1, wherein the user interface element is capable of accepting a user selection of the query.

3. The article of manufacture of claim 1, wherein aggregating the measure along the dimension comprises performing an aggregation function along the dimension.

4. The article of manufacture of claim 1, wherein aggregating the measure along the dimension comprises performing an aggregation function along all the dimensions inferred from the result set.

5. The article of manufacture of claim 1, wherein inferring the set of dimensions and measures within the result set, further comprises:

identifying a first field of the one or more fields as numeric and non-discrete; and adding the first field to the measures in the set of dimensions and measures.

6. The article of manufacture of claim 1, wherein inferring the set of dimensions and measures within the result set, further comprises:

identifying the first field of the one or more fields within the result set as non-numeric;

adding the first field to the dimensions in the set of dimensions and measures; and adding a count of the first field to the measures in the set of dimensions and measures.

7. The article of manufacture of claim 1, wherein inferring the set of dimensions and measures within the result set, further comprises:
- identifying the first field of the one or more fields within the result set as numeric and discrete;
- adding the first field to the dimensions in the set of dimensions and measures; and
- adding the first field to the measures and a count of the third field to the measures in the set of dimensions and measures.

8. The article of manufacture of claim 1, further comprising:
- identifying a modification in the query; and
- performing corresponding modification to the visual representation of the collection of the aggregation.

9. The article of manufacture of claim 8, further comprising re-aggregating to create an updated collection of the aggregation in accordance with the modification in the query.

10. The article of manufacture of claim 1, wherein inferring the set of dimensions and measures within the result set, further comprises:
- upon identifying the first field of the one or more fields within the result set as a dimension containing unique values for the result set, excluding the first field from the set of measures and dimensions.

11. The article of manufacture of claim 1, further comprising:
- providing a selection for determining a type of the visual representation of the collection of aggregations.

12. The article of manufacture of claim 1, further comprising:
- providing a selection for determining a manner of rendering the collection of aggregations.

13. The article of manufacture of claim 12, further comprising:
- performing one or more iterations of the result set in the data report, based upon the determined manner of rendering the collection of aggregations.

14. A computer implemented method for analyzing data within a data report, the method comprising:
- retrieving a data report including a result set and associated metadata of the result set;
- analyzing the result set to identify one or more fields present in the result set;
- based upon the fields and corresponding one or more field types, inferring a set of dimensions and measures within the result set;
- based upon the inferred set of dimensions and measures, rendering one or more user interface elements for defining a query, wherein each of the one or more user interface elements is associated with a member of the set of dimensions and measures inferred from the result set;
- receiving a user selection of one or more of the rendered user interface elements for inclusion in the query;
- aggregating the measures along the corresponding dimensions associated with the selected user interface elements included in the query, to generate a collection of aggregations; and
- rendering a visual representation of the collection of the aggregations.

15. A computing device operable for analyzing data within a data report comprising:
- a processor operable for reading and executing instructions stored in one or more memory elements; and
- the one or more memory elements storing instructions for:
  - a data report repository to store one or more data reports including a result set and associated metadata of the result set;
  - a report analyzer to analyze a result set of a selected data report to infer one or more dimensions and one or more measures for the result set;
  - the memory to store the inferred dimensions and measures;
  - the user interface module to render:
    - a first user interface element on the user interface, based upon a dimension from the inferred dimensions, the first user interface element operable for defining a query, and
    - a second user interface element on the user interface, based upon a measure from the inferred measures, the second user interface element operable for defining the query;
  - an aggregation engine to aggregate the measures along the dimensions associated with the selected user interface element included in the query, to generate a collection of aggregations; and
  - a visualization engine to render a visual representation of the collection of aggregations on the user interface.

16. The computing device of claim 15 wherein the user interface module is configured to:
- receive a user selection for the selected data report; and
- receive a selection of first user interface element and the second user interface element for inclusion in the query.

17. The computing device of claim 15, further comprising an accumulator for accumulating one or more measures for values in a dimension having a similar value, wherein the dimension is associated with the query.

* * * * *